May 31, 1966  T. C. BRAUCHT  3,254,192
WELDING METHOD AND APPARATUS
Filed Nov. 30, 1962  3 Sheets-Sheet 1

INVENTOR
THEODORE C. BRAUCHT

BY  *Dean Laurence*

ATTORNEY

INVENTOR
THEODORE C. BRAUCHT

May 31, 1966  T. C. BRAUCHT  3,254,192
WELDING METHOD AND APPARATUS
Filed Nov. 30, 1962  3 Sheets-Sheet 3

INVENTOR
THEODORE C. BRAUCHT

BY  Dean Lawrence
ATTORNEY

3,254,192
WELDING METHOD AND APPARATUS
Theodore C. Braucht, 530 Roper St., Houston, Tex.
Filed Nov. 30, 1962, Ser. No. 241,373
16 Claims. (Cl. 219—76)

This invention relates to welding method and apparatus and more particularly to a method of and apparatus for cladding or building up the interior wall of open metal objects such as pump shells, tanks and other vessels.

In dredging operations, a typical large dredge pump shell ranges between 12 to 14 feet in diameter and weighs from 24,000 to 40,000 lbs. These pump shells in general have a circular door opening and a flange with spaced bolt holes for mounting the pump doors and are relatively thin walled compared to their size. During their service life pump shells are subjected to great wear on the interior side wall as the gravel, stone and other abrasive materials pumped through the shell gouge and wear away the metal wall.

As the cost of a typical large pump shell is several thousand dollars, it is necessary to extend the service life of the pump shell as long as possible. Presently, this is accomplished by building up the interior side wall of the shell with one or more layers of weld metal applied manually by a skilled welder. Because of the large size of the pump shell and the fact that they must be built up several inches in many instances, the present-day practice of manual weld metal build-up is not only tedious and time-consuming but is very expensive. Further, in most instances, even a skilled welder cannot deposit continuous and consistently uniform beads of weld metal over such a large surface area. This leads to excessive heating and non-uniform metal build-up of portions of the shell wall and insufficient build-up of other portions. The deposit of thick, heavy non-uniform beads of weld metal is accompanied with excessive heating of the shell wall causing stress, warpage, porosity, fissures and the formation of weak spots in the pump shell. As the flange forming the door opening of the pump shell is provided with mounting bolt holes located at close working tolerances, uncontrolled warpage resulting from the conventional manual build up necessitates an expensive refinishing of the pump shell and often relocation of the mounting bolt holes in the pump doors.

To illustrate the disadvantages of the conventional manual weld metal build-up of pump shells, the inventors have found that it requires approximately 602 man-hours for a skillful welder to build-up the interior wall of a typical 12-foot diameter 24-inch dredge shell weighing about 30,000 pounds. During this 602 man-hour-period, a skillful welder deposits approximately 2,000 pounds of weld metal on the interior wall of the pump shell.

Experience has shown that even with this build-up the wall thickness of the finished pump shell may be one-half inch or more short of the specification for the pump shell and, furthermore, because of warpage caused by manual build-up additional time and money are required to remachine the door mounting flange of the pump shell and redrill out-of-line mounting bolt holes. The approximate cost of rebuilding a typical pump shell manually as described has been found to be approximately $7,500 and such a rebuilt pump shell has a service life expectancy of only two-thirds that of a new shell.

In addition to the actual cost of manually rebuilding a typical pump shell as described, there is a further cost as the dredge of course must be shut down for dismounting the pump shell and remain out of service until the shell is rebuilt and remounted unless a number of replacement shells are available. Further, the cost of handling and transporting the heavy shell to and from the worksite as presently required is an added cost.

I have discovered that warpage of the shell caused by manual welding build-up can be avoided by rapidly depositing a relatively narrow, continuous stress-relieving bear of weld metal substantially 3/8" width and 3/16" thickness at speeds of up to 100" per minute with a preferred range of 35–100 inches of bead per minute. This is build up a skilled welder cannot possibly perform manually.

Accordingly, it is an object of this invention to provide a new and improved method of and apparatus for building up the interior of large heavy metal objects such as pump shells, tanks and/or the like.

A further object of this invention is to provide a method of and apparatus for building up the interior wall of a pump shell by rapidly depositing a continuous uniform bead of weld metal on the interior wall of the shell.

Yet another object of this invention is to provide a method of and apparatus for building up the interior wall of an open metal object such as a pump shell by depositing a uniform bead of weld metal thereon at speeds up to 100 inches per minute with a preferred range between 35 and 100 inches per minute, thereby controlling warpage of the shell.

Still a further object of this invention is to provide a method of and apparatus for building up the interior wall of a pump shell by supporting a pump shell in a fixed position and rotating a welding torch within the pump shell so as to rapidly deposit continuous uniform stress-relieving beads of weld metal.

Another object of this invention is to provide apparatus for building-up the interior wall of a pump shell by depositing uniform beads of weld metal thereon including means for supporting a welding torch externally of the interior of said pump shell and on an axis extending through the opening of said pump shell and including means engaging said pump shell for rotating the welding torch within and adjacent the interior side wall of the pump shell.

A further object of this invention is to provide welding apparatus for building up the interior side wall of a pump shell by rapidly depositing continuous uniform beads of weld metal thereon by rotating an automatic welding torch within the pump shell and including vertical and horizontal adjustment means for said welding torch whereby the entire surface of the interior wall of the shell may be built-up with a uniform thickness of weld metal comprising a plurality of continuous adjacent uniform weld metal beads of substantially the same width and thickness.

These and many other objects may be obtained by practicing the method of my invention which in general may include the steps of: supporting an object to be built up such as a pump shell in a fixed position; supporting and rotating an automatic welding torch within and adjacent the interior side wall of the pump shell at speeds of between 35 and 100 inches per minute while simultaneously feeding weld metal to said welding torch at speeds of up to 300 inches per minute with a preferred range of between 100 and 300 inches per minute, thereby rapidly depositing a narrow uniform stress-relieving bead of weld metal of substantially the same width and thickness on the interior wall of the pump shell whereby the heat of welding is distributed rapidly over a large surface area of the pump shell preventing warpage thereof.

In general, apparatus incorporating the features of my invention may include a rotatable boom and means for supporting the rotatable boom over the door opening of the pump shell. An automatic welding torch is secured to the rotating boom and supported within the interior of the pump shell, and drive means attached to the rotatable boom engage the pump shell and rotate the welding torch within the pump shell so as to automatically deposit continuous uniform stress-relieving beads of weld metal on the interior wall of the pump shell.

Horizontal or cross feed and vertical adjustment means are provided for positioning the automatic welding torch relative to the interior wall of the pump shell so that the entire interior surface of the pump shell may be built up by depositing a plurality of continuous adjacent uniform beads of weld metal.

The manner of accomplishing the foregoing objects as well as further objects and advantages of my invention will be made manifest in the following description taken in conjunction with the accompanying drawing in which.

Figure 1:
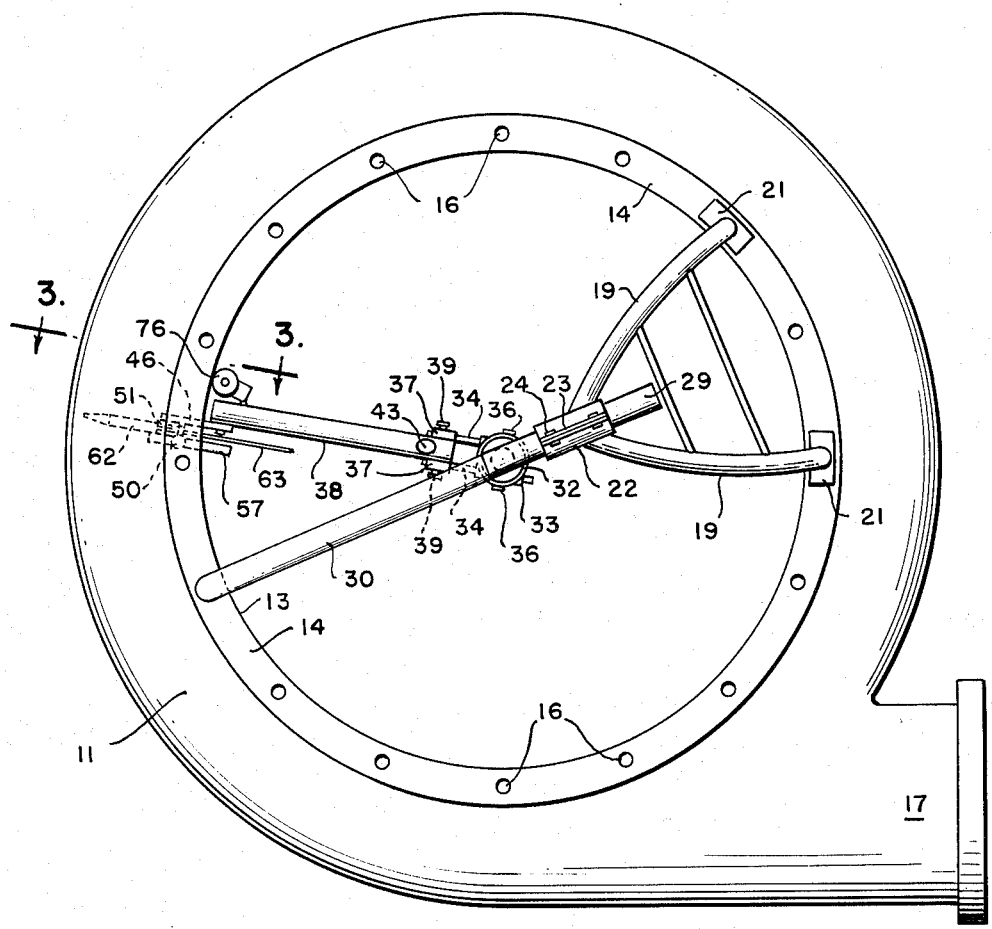
FIGURE 1 is a plan view of an apparatus in accordance with my invention, including a support for positioning a rotatable boom having an automatic welding torch affixed thereto relative to the interior wall which is to be built up.
Figure 2:
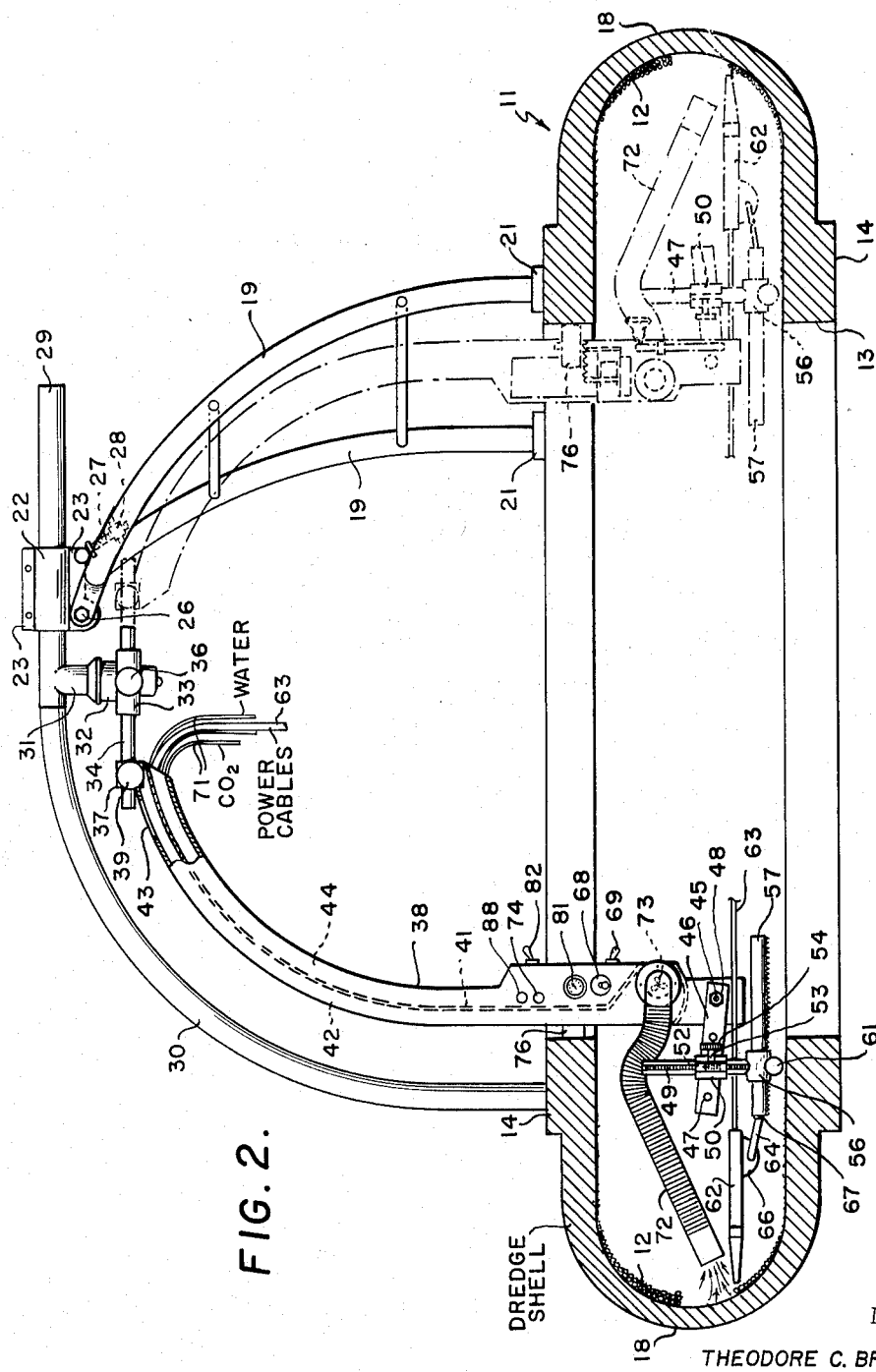
FIGURE 2 is a sectional view illustrating the manner in which the welding torch attached to the rotatable boom is adjustably positioned relative to the interior wall of the pump shell and drive means mounted on the rotatable boom engaging the pump shell for rotating the welding torch within the pump shell.

Referring now to FIGURES 1 and 2 of the drawings, a preferred embodiment of my invention is shown employed to build up the interior wall of a typical large heavy pump shell 11 by depositing layers of continuous uniform beads 12 of weld metal as illustrated by the small circles. Although the preferred embodiment of my invention relates to the build up of large pump shells, it is to be understood that the invention may be utilized to build up the interior wall of any type of open metal object such as tanks, clam shells, buckets, containers and the like.

The shell 11 is slightly voluted and is provided with opposite circular openings or doors 13, circular raised flanges 14 having a plurality of equally spaced mounting bolt holes 16 therein for mounting the pump doors on the shell, and an orifice 17 through which sand, gravel and other abrasive materials are pumped. As shown in FIGURE 2, the end of the shell 11 is curved through approximately 180° in a vertical plane and the thickness of the end wall 18 of such a typical large shell may be 6 inches or more, and the flat and curved interior wall may be gouged and worn away as much as five inches during normal usage, requiring the interior wall to be built up with several thousand pounds of weld metal.

To accomplish this build up while at the same time controlling warpage of the shell in accordance with my invention, a curved tubular A-frame 19 provided with suitable mounting plates 21 secured to the legs of the A-frame is mounted on the door flange 14 as by tack welding, bolting or other suitable manner, permitting the A-frame to be easily installed and removed. The tubular A-frame extends over and along a diametrical line of the circular door 13 and a split tubular centering clamp 22 having flat oppositely disposed flanges 23 and clamp adjusting bolts 24 extending therethrough is pivotally mounted on a cross pin 26 extending through the end of the A-frame 19 and the lower flange 23.

The centering clamp 22 is free to pivot about the cross pin 26 in a vertical plane between the legs of the A-frame 19. A threaded level adjustment bolt 27 swivelly attached to the lower flange 23 is threadably received within a shoulder 28 formed near the apex of and on the inside of one leg of the A-frame 19 so that the tubular centering clamp may be adjustably supported in the horizontal or any other desired position by turning the adjustment bolt 27. A centering shaft 29 adjustably received within the centering clamp 22 is provided with a downwardly extending spindle 31 that is received within suitable bearings, not shown, in a centering head 32 adapted to rotate about the spindle 31.

The centering shaft 29 may also be provided with a downwardly curved leg portion 30 attached to as by fasteners or clamps or integrally formed thereon that engages and may be attached to the top surface of the door flange 13 or other exterior portion of the shell 11 and which acts as a third supporting leg for the apparatus.

Parallel guide tubes 33 secured to the opposite sides of the centering head receive spaced guide rods 34 adjustably secured therein by means of adjustment bolts 36 threadably received within the respective guide tubes.

The free end of the curved rotating boom is straight and extends through the door 13 into the shell 11. The radius of curvature of the boom 38 is less than that of the A-frame 19 so that when the boom 38 is rotated about the spindle 31 it passes completely around the interior of the shell and under the A-frame 19 as shown in FIGURE 2. An interior divider wall 41 extends throughout the boom 38 forming a smoke venting compartment 42 provided with a vent opening 43 at the top thereof and a service cable and conduit compartment 44 for power, gas and water service lines.

Guide rods 34 extend from the centering head 32 and are adjustably received within parallel guide tubes 37 rigidly secured to the opposite side of a curved hollow substantially rectangular rotating boom 38 formed of a light strong sheet metal or the like so that it may be easily installed. The guide rods 34 are adjustably secured within the guide tubes 37 by means of adjustment bolts 39 that are threaded through the guide tubes into engagement with the guide rods 34. A mounting arm 46 provided with a plurality of spaced apertures 47 along its length is attached to the lower portion of boom 38 by means of a threaded member 45 that extends from the boom through an aperture 47 and a threaded adjustment nut 48. A vertical feed rack 49 extends through a housing 50 secured to a mounting 51 (FIGURE 1) bolted to and extending from the mounting arm 46. The vertical feed rack engages a pinion gear 52 within the housing 50 and is rigidly secured to a shaft 53 extending through the side wall of the housing 50 having a vertical adjustment knob 54 thereon. The lower end of the vertical feed rack 49 terminates in a housing 56 through which passes a horizontal feed rack 57 that engages a pinion gear 58 (FIGURE 3) rigidly secured to a shaft extending through the side wall of the housing 56 and having a horizontal feed knob 61 attached thereto.

An automatic arc welding torch 62 supplied by a suitable power cable 63 that extends through the cable inlet compartment 44 is pivotally attached to an extension rod 64 secured to the end of the horizontal feed rack 57. The end of the extension rod 64 is turned and threaded and extends through an aperture in a projecting ear 66 formed on the welding torch 62. A torch adjustment wing nut 67 is threaded on the extension rod 64 and the welding torch 62 may be rigidly supported in any desired angular position relative to the extension rod 64 and the interior wall 18 of the shell 11.

The automatic arc welding torch 62 may be a conventional commercially-available welding apparatus such as the A-10 torch manufactured by the National Cylinder Gas Company, and capable of feeding and depositing 300 inches per minute of welding wire or rod composed of the desired build-up metal. In the preferred embodiment a weld rod of a 50 Rockwell C hard facing material is employed, although a variety of other weld metals may be employed as determined by the type of shell or other object to be rebuilt and other parameters such as a weld temperature, the speed of bead deposited, wall thickness, etc.

The speed of weld rod feed is determined by the speed of the torch laying the bead and the thickness and width of the bead desired as will become apparent. Conventional means (not shown) are provided for feeding the weld rod to the torch 62 at speeds up to 300 inches per minute with a preferred but not restricted to range varying between 100 and 300 inches per minute and a weld rod feed control switch 68 is connected in electrical circuit with the weld rod drive means so that the weld rod feed can be adjusted as desired. An arc control switch 69 is provided for turning the electric arc on and off. The automatic weld torch 62 may also include conventional means for spraying liquid $CO_2$, or other gases or gas mixtures onto the weld area so as to maintain the proper cooling and shielding atmosphere. These services are provided by way of suitable conduits 71 that extend through the cable inlet compartment 44. A flexible semi-rigid smoke and fume duct 72 is attached to the rotating boom 38 and opens into the venting compartment 42. A motor-driven exhaust fan 73 is provided for exhausting smoke and fumes and a control switch 74 for the exhaust fan is mounted on the rotating boom 38 at a convenient location.

As automatic arc welding torches of the type employed in the preferred embodiment are conventional and commercially available, the actual welding operation need not be described in detail. And although arc welding is employed in the preferred embodiment, numerous other welding methods may be employed including gas, open arc, submerged arc and inert gas shielded arc welding can be employed.

Figure 3:
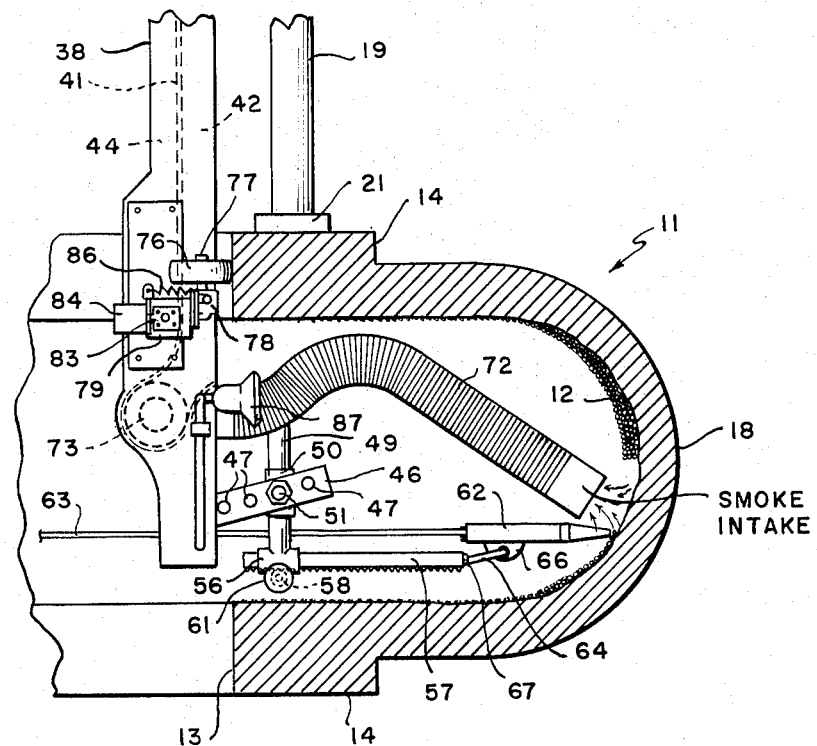
FIGURE 3 is a sectional view taken along the line 3—3 of FIGURE 1 illustrating boom drive means and the welding torch adjustment means in greater detail.

Referring now to FIGURES 2 and 3, a friction drive wheel 76 is mounted on a vertical drive shaft 77 and engages the interior face of the flange 14 forming the door 13. The drive wheel 76 may also be arranged to engage an exterior surface of the shell if desired. Drive shaft 77 terminates in a suitable gear box 78 and is driven at variable, selected speeds by a fractional horsepower electric motor 79 through the gear box 78. A motor speed control rheostat 81 and a motor "On-Off-Reverse" switch 82 are connected in electrical circuit with the motor 79 and are mounted at a convenient location on the rotating boom 38. The motor 79 and gear box 78 are mounted on a tensioned, movable leaf 83 of a spring hinge assembly comprising the movable leaf 83 and a fixed leaf 84 rigidly attached to the rotating boom 38. A tension spring 86 is provided to resiliently hold the wheel 76 into frictional engagement with the vertical inside face of the door flange 14 so that when the motor 79 is driven the rotating boom 38 is rotated around the spindle moving the welding torch 62 over the interior wall at a controlled uniform speed. A flood lamp 87 adjustably attached to the boom 38 illuminates the welding torch and side wall 18. A suitable switch 88 is provided for turning the lamp on and off as needed.

*Operation*

As stated, manual build-up of large, heavy pump shells by a skilled welder is not only slow, but inefficient, and even more seriously, causes excessive warpage of the shell, requiring expensive refinishing and reboring of mounting bolt holes. This invention overcomes the disadvantages of conventional shell build-up by controlling shell warpage to allowable limits if not eliminating warpage by depositing very narrow, fast continuous beads of the weld metal of minimum cross-section on the interior shell wall thereby distributing the heat of welding over a side surface of the shell. By laying these continuous beads side by side, a thin uniform layer of hard faced metal is deposited. A number of these layers are deposited one on the other until the shell wall is built up to the desired thickness. In many cases the entire interior surface of the shell wall may be built up to 5 inches or more with little if any warpage of the shell.

An essential feature of this invention is the exact control of the weld metal bead characteristics and the rapid dissipation of welding heat, thereby controlling shell warpage. There are generally two factors that determine the weld metal bead characteristic and these are: (1) the welding torch speed which determines the inches per minute of weld metal disposited. I have discovered that a deposition or torch speed of up to 100 inches per minute with a preferred but not limiting speed range between 30–100 inches per minute, although this is a variable depending upon the type of weld wire employed and the metal of which the object being built up is made. It is apparent that a deposition rate of between 30–100 inches exceeds that of a skilled welder many times. (2) the welding wire feeding speed. The weld wire feed is variable up to 300 inches per minute and within a preferred but not restricted range between 100 and 300 inches per minute and in general is determined by the size and type of weld wire used. As an example by setting the welding wire feed rate at 285 inches per minute, employing a weld wire $7/64''$ in diameter, and maintaining a torch speed of 78 inches per minute, a continuous, uniform stress-relieving bead of weld metal approximately $3/8$ inch wide and $3/16$ inch thick is rapidly deposited on the interior wall of the shell 11—a performance that the conventional manual method cannot approach. Although a bead $3/8$ inch wide and $3/16$ inch thick is preferred, the exact dimensions of the bead may be varied depending upon the weld metal and the metal on which deposited. It is important that the beads be approximately twice the thickness in width so as to assure rapid heat dissipation and stress-relieving beads.

It has also been discovered that it is important that the tip of the welding torch 62 be maintained at a substantially constant distance from the shell wall so as to avoid excess heating and maintain the shielding effect of the $CO_2$ or other gas forming the shielding atmosphere, although the invention can be practiced without the use of a shielding gas. Furthermore, if the torch 62 is positioned too far from the wall premature burn-off of the weld wire, porosity in the weld bead, and an imperfect bond between weld metal and wall results. As the shell 11 is voluted and not circular, and gouges of varying depths may be found in the wall, the horizontal or cross torch feed knob 61 is turned and as the build-up progresses the torch 62 is adjusted vertically by turning the vertical adjustment knob 54.

A typical manual build-up operation was described previously. The following table compares the manual performance with that of this invention and clearly illustrates the outstanding superiority and economy of my invention.

|  | Invention | Manual |
| --- | --- | --- |
| Cost of Build-Up | $4,200.00 | $6,100.00. |
| Additional finishing Cost | None | $1,400.00. |
| Total Cost | $4,200.00 | $7,500.00. |
| Manhours Required | 239 | 602. |
| Metal Deposited | 3,500 lbs | 2,000 lbs. |
| Thickness of Finished Shell | Full Factory Specifications. | ½ inch short of specification. |
| Warpage | None | Excessive. |
| Life of Rebuilt Shell | 1⅔ times New Shell | ⅔ life of New Shell. |

The above comparison is based on a test made on identical 24-inch pump shells, 12 feet in diameter and both weighing approximately 30,000 pounds, and although these figures are typical, they clearly demonstrate the outstanding advantages obtained by our invention.

In practice, the easily mounted A-frame 19 and boom assembly having been attached to a pump shell 11 supported in a horizontal position, the centering shaft 29 is leveled and the centering head 32 and spindle 31 positioned directly over the center of the door 13. This may be accomplished by first locating the center of the door 13 with diametrical cross lines of string stretched across the door. The centering clamp 22 and centering shaft 29 are raised to the horizontal position by turning the level adjustment bolt 27. A plumb bob is then secured to the centering head 32 on the longitudinal axis of the spindle 31 and the centering shaft 29 adjusted in the centering clamp 22 until the plumb bob is suspended directly over the intersection of the cross strings. The clamp bolts 24 are then tightened and the guide rods 34 adjusted until the rotating boom 38 is positioned equidistant from the circular door opening of the shell 11.

The welding torch 62 is properly positioned by adjusting the mounting arm 46 and the vertical and horizontal feed racks 49 and 57 while the welding torch 62 is turned to and rigidly supported in the correct angular position relative to the interior wall 18 of the shell 11. As shown in FIGURE 3, the weld beads 12 are deposited on the flat portion of the wall surface initially and the build up progresses along the curved portion of the end wall 18 to its approximate mid-part. Subsequent layers of weld metal are deposited on each preceding layer until the desired thickness of build-up is accomplished on approximately half of the shell side wall and the build-up procedure is then repeated for the remaining half of the shell wall. Adjustments of the welding torch are performed by turning the vertical and horizontal adjustment knobs 54 and 61 and by varying the angle of the torch 62 relative to the shell wall. Although build up is preferably commenced at the door opening and progresses inwardly, this procedure may be varied if desired.

Assuming that the torch 62 has been properly positioned and spaced the correct distance from the shell wall, the motor control switch 82 is turned on energizing the motor 79 to drive the friction wheel 76 which is held in engagement with the interior face of the door flange 14 by the spring 86, causing the boom 38 to rotate about the spindle 31 at the proper speed in either direction as determined by the setting of the control rheostat 81. The electric arc is turned on by operating the switch 69, and the weld rod drive means started by operating the switch 68, the speed of weld rod feed having been adjusted to the desired rate. In addition, the exhaust fan 73 is turned on and the rapid deposit of a narrow uniform stress-relieving bead 12 commences.

An operator within the shell observes the progress of the welding torch 62 as it progresses around the interior wall 18 of the shell 11 and makes any adjustments necessary to accommodate for gouges and worn spots in the shell wall by turning the cross feed control knobs 61 and 54. This action maintains the welding torch 62 at a constant correct distance from the shell wall 18 preventing porosity, excessive weld rod burn-off and maintaining the weld area in a shielded atmosphere of gas. A swivel stool, not shown, may be provided for the operator so that he may turn with the torch as it advances around the shell wall. In addition, the swivel mounted flood lamp 87 may be turned on for illuminating the shell wall.

By employing a preferred but non-restricted weld torch travel speed range of between 30–100 inches per minute and a weld rod wire speed of approximately 285 inches per minute, a continuous uniform stress-relieving bead substantially $3/16$ of an inch thick and $3/8$ of an inch wide is rapidly deposited on the shell wall, the time required for a single pass of the torch 62 around the full circumference of a pump shell 12 feet in diameter being 3 to 5 minutes. As the torch 62 approaches the end of each bead, the operator can stop the boom and make the necessary adjustment or simply turn the vertical and horizontal control knobs so that the next bead is deposited adjacent the bead just completed, thereby depositing a uniform layer of hard faced weld metal on the side wall.

Thus, from the foregoing, it can be seen that my invention provides a novel welding method and apparatus by rapidly depositing narrow uniform beads of weld metal, thereby rapidly distributing the heat of welding over a wide area of the shell—eliminating warpage and other defects that result in the manual build-up of such shells. Furthermore, the apparatus of this invention is extremely portable being light in weight and easily mounted and removed, and thus eliminates the transportation of the pump shell 11 to a welding shop and cuts the manual build-up time by nearly two-thirds.

Although a preferred embodiment of the invention has been described as relating to the build up of large pump shells, it is to be understood that this invention may be employed to build up or clad numerous other open objects such as tanks, bins, containers and other objects. Furthermore, numerous modifications and arrangements of my invention may be made by those skilled in the art that fall within the purview of this invention which is to be limited only by the scope of the appended claims.

I claim:

1. The method of building up the interior of a metal shell having an opening about its longitudinal axis by depositing continuous beads of weld metal thereon comprising the steps of: maintaining the shell in a fixed horizontal position; positioning a rotatably mounted welding torch relative to the interior sidewall of said shell; rotating said torch at speeds between about 35 and about 100 inches per minute while feeding weld metal to said welding torch at a rate of speed within the range of up to 300 inches per minute to deposit a bead of weld metal of a width approximately twice that of its thickness on the interior of said shell as determined by the speed of movement of said welding torch and the rate of weld metal feed to said torch.

2. The method of claim 1 wherein the shell to be built up is a pump shell and the welding torch is vertically adjusted upon the completion of each continuous bead whereby a uniform layer of weld metal comprising a single continuous bead of weld metal is deposited on the interior wall of said pump shell.

3. The method of claim 1 wherein the welding torch is rotated at a speed of between 35–100 inches per minute and the rate of weld metal feed to said welding torch is between 100–300 inches per minute thereby depositing a bead of weld metal approximately $3/8$ of an inch wide and $3/16$ of an inch thick as determined by the speed of movement of said welding torch and the rate of weld metal feed to said torch.

4. The method of claim 1 wherein the shell is built up by depositing a plurality of layers of weld metal bead one on the other over the interior surface of the shell.

5. The method of claim 4 wherein the weld metal build up of each layer of beads commences at the edge of the interior surface of the shell to be built up and progresses inwardly toward the approximate mid-part of said shell, and said build up is repeated for the remaining approximate half of said shell.

6. Welding apparatus for depositing a continuous uniform bead of weld metal on the interior wall of an open metal object comprising: a rotatable support boom; means attached to said rotating support boom and supported within said metal object for depositing weld metal; and, drive means mounted on said rotatable support boom for engaging said metal object and for rotating said support boom about an axis extending through said opening whereby a continuous uniform bead of weld metal can be deposited on the interior wall of said metal object.

7. Apparatus for building up the interior wall of an open metal object such as a pump shell comprising a rotatable support boom; means for supporting said rotatable support boom over the opening of said metal object; welding means mounted on said rotating support and supported within said open metal object for depositing weld metal; and, drive means mounted on said rotatable support boom and engaging said metal object for rotating said rotatable support boom about an axis extending through said opening in said metal object whereby said welding means is moved at speeds above about 35 inches per minute relative to the interior wall of said open metal object thereby depositing a continuous uniform bead of weld metal on the interior wall of said object.

8. Apparatus as defined in claim 7 whereby the width of said weld metal bead is approximately twice that of its thickness as determined by the speed of movement of said welding torch and the rate of weld metal feed to said torch.

9. Apparatus as defined in claim 7 wherein the rate of weld wire feed is variable between 100–300 inches per minute and the speed of travel of the welding means is variable between 35–100 inches per minute, whereby a narrow continuous bead of weld metal approximately 3/8 inch wide and 3/16 inch thick is deposited on the interior wall of said open metal object, the dimensions of said bead being determined by the speed of movement of said welding torch and the rate of weld metal feed to said torch.

10. Apparatus as defined in claim 7 including horizontal adjustment means for positioning said welding means relative to said interior wall of said metal object.

11. Apparatus as defined in claim 7 including vertical adjustment means for vertically positioning said welding means relative to said interior wall of said metal object.

12. Apparatus as defined in claim 7 wherein said support means comprises an A-frame mounted on said metal object.

13. Apparatus as defined in claim 12 wherein said A-frame includes a third supporting leg.

14. Apparatus as defined in claim 6 wherein said drive means includes a friction wheel for engaging said metal object and motor means for rotating said friction wheel against said metal object thereby rotating said support boom.

15. Apparatus as defined in claim 6 including center adjustment means for adjustably positioning said rotatable boom.

16. Apparatus as defined in claim 6 including means for angularly adjusting said welding means relative to the interior wall of said metal object.

References Cited by the Examiner

UNITED STATES PATENTS

| | | | |
|---|---|---|---|
| 2,046,999 | 7/1936 | Bredtschneider | 240—2 |
| 2,772,625 | 12/1956 | Clark | 98—115 |
| 2,839,663 | 6/1958 | McCollom | 219—76 |
| 2,902,588 | 9/1959 | Zouck et al. | 219—76 |
| 2,912,562 | 11/1959 | Donovan | 219—76 |
| 3,010,010 | 11/1961 | Jackson et al. | 219—76 |
| 3,075,067 | 1/1963 | Axhelm | 219—76 |

RICHARD M. WOOD, *Primary Examiner.*